Aug. 17, 1965   M. PAYNOR   3,201,162

TURN LOCK ASSEMBLY

Filed April 6, 1964

INVENTOR.
Melvin Paynor
BY
Salter + Michaelson
Attorneys.

United States Patent Office 3,201,162
Patented Aug. 17, 1965

3,201,162
TURN LOCK ASSEMBLY
Melvin Paynor, Providence, R.I., assignor to Fulford Manufacturing Company, Providence, R.I., a corporation of Rhode Island
Filed Apr. 6, 1964, Ser. No. 357,626
6 Claims. (Cl. 292—202)

The present invention relates to a turn lock assembly. More particularly the present invention relates to a turn lock assembly that is used in the securement of a flap in a closed position on a wall of a bag or receptacle such as a ladies' handbag or the like.

The present invention has particular application in the turn lock type of fastening device wherein an eyelet type grommet is secured to the flap of a handbag or the like and a turn lock turn element is received in the opening in the grommet and is axially rotated to locate the turn element in latched position with respect to the grommet. Turn locks of this type are well known and have found some favor in the trade because of the simplicity of securement of the turn lock assembly to the wall of the handbag, and further because of the ornamental appearance of the assembly. Since turn lock assemblies normally include a housing of box-like configurations that are attached to the wall of the handbag on which the device is secured, it is necessary that the lock member thereof be restrained within the housing from axial movement and be further prevented from withdrawal from the housing. In order to accomplish this purpose, a unique constructional arrangement is provided in the present invention for securing the turn element or lock member in place within the housing of the assembly; the lock member including an enlarged turn knob and a shank portion that is formed with a reduced stem on the end of which a tapered head portion is formed. The tapered head portion is enlarged with respect to the stem and defines a shoulder therewith. A spring is located within the housing and includes a bottom portion that defines the bottom of the housing and further includes U-shaped portions having free ends, the free ends engaging the shoulder defined by the head portion and stem. The spring thus cooperates with the enlarged turn knob located exteriorly of the housing to restrict or limit axial movement of the lock member and further prevents withdrawal of the lock member from the housing.

Accordingly it is an object of the present invention to provide a turn lock assembly that includes a lock member that is mounted for rotation within a housing of the assembly and that is limited in axial movement therein and is further prevented from withdrawal therefrom.

Another object of the invention is to provide a lock member of a turn lock assembly that includes a reduced stem on the end of which an enlarged head portion is formed, a shoulder being defined by the junction of the reduced stem and head portion that receives the free ends of a spring member, wherein axial movement of the lock member is limited.

Still another object is to provide a lock member for use in a turn lock assembly that is formed with a stem having a shoulder formed thereon that cooperates with a spring to limit the axial movement of the lock member in its assembled position in a housing.

Still another object is to provide a spring construction having spaced free ends that cooperate with a lock member to limit axial movement of the lock member in a housing and to prevent the withdrawal thereof from the housing.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
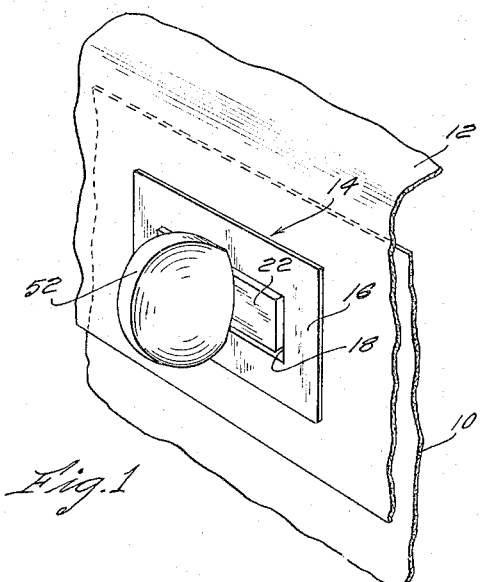
FIG. 1 is a fragmentary perspective view of a portion of a wall of a handbag and a flap associated therewith, the turn lock assembly embodied in the present invention being shown in the latched position thereof for locking the flap to said wall.

Refering now to the drawing and particularly to FIG. 1, a fragmentary portion of a wall 10 is illustrated, the wall 10 being formed as part of a bag construction or similar article, such as a woman's handbag. Also shown in fragmentary form in FIG. 1 is a flap 12 that may be formed as part of the bag construction and that is adapted to overlie the mouth thereof for closing the bag in a conventional manner. It is understood that the turn lock assembly embodied in the present invention may be applied to other forms of receptacles or bags as desired without departing from the spirit of the invention to be described.

Referring again to FIG. 1, a turn lock assembly generally indicated at 14 is illustrated and includes a grommet 16 that is secured to the flap 12 and that is formed with an opening 18. As will be described the opening 18 cooperates with an opening formed in the flap 12 to receive a turn knob of a lock member of the turn lock assembly. The grommet 16 may be secured to the flap 12 in any conventional manner and does not form a part of the invention embodied herein, it being further understood that the grommet 16 may be formed in various shapes and configurations to define an ornamental part of the handbag to which it is secured.

Referring now to FIGS. 2–7 the turn lock assembly 14 is shown further including a housing, generally indicated at 20 that is defined by a top wall 22 in which a non-circular opening 24 is formed. As ilustrated in FIG. 6 the opening 24 is preferably square-shaped in configuration, such configuration providing for the insertion of a lock member into the housing 20 as will be described. The housing 20 further includes side walls 26 and 28 to which projecting prongs 30 and 32 are joined respectively, the projecting prongs 30 extending through the wall 10 to secure the housing to the wall 10 in the conventional manner. Joined to the top wall 22 and bent at right angles with respect thereto are end walls 34 and 36 that cooperate with the top wall 22 and the side walls 26, 28 to form a box-like construction. The bottom of the housing 20 is open for receiving a spring generally indicated at 38, the spring 38 thus forming the bottom wall of the housing 20.

Figure 7:
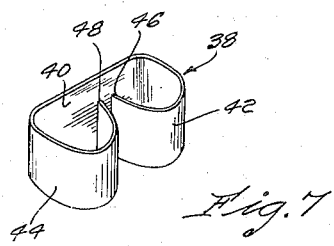
FIG. 7 is a perspective view of the spring member that is disposed in the housing illustrated in FIG. 6.

Referring to FIG. 7, the spring 38 as shown is of the leaf spring type and includes a bottom portion 40 to which U-shaped portions 42 and 44 are integrally joined. The U-shaped portions 42 and 44 terminate in free ends 46 and 48, respectively, the free ends 46, 48 being spaced from each other and further being spaced from the bottom portion 40. As will be described, the free ends 46, 48 of the spring 38 cooperate to positively secure a lock member generally indicated at 50 in FIG. 5 within the housing 20.

Figure 5:
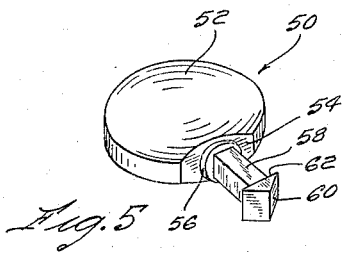
FIG. 5 is a perspective view of the lock member of the turn lock assembly embodied in the present invention.
Figure 6:
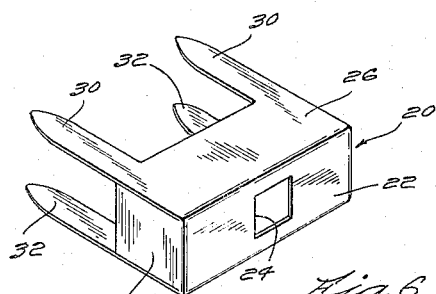
FIG. 6 is a perspective view of the housing in which the lock member is received.

Referring now to FIG. 5, the lock member 50 is illustrated and includes a turn element or knob 52 that is enlarged sufficiently to permit the grasping thereof by the user of the handbag or the like. As illustrated in FIG. 5 the turn knob 52 has a generally circular configuration when viewed in elevation although the external surfaces thereof are somewhat convex so as to form a pleasing and ornamental appearance. It is understood that the turn knob 52 may be constructed and shaped in various configurations and in accordance with the design of the bag on which the turn lock assembly is mounted. Formed on the underside of the turn knob 52 is a flat portion 54 to which a shank portion of the lock member 50 is joined. The shank portion includes a circular bearing portion 56 from which a stem 58 projects. The diameter of the bearing portion 56 is dimensioned so as to be received within the opening 24 of the housing top wall 22 in bearing relation with respect to the sides of the opening. The stem 58 is also non-circular in configuration and as shown in FIG. 5 is square-shaped in cross section. Joined to the outer end of the stem 58 is a tapered and enlarged head portion 60, the junction of the stem 58 and the tapered head portion 60 defining a square shoulder 62.

Figure 2:
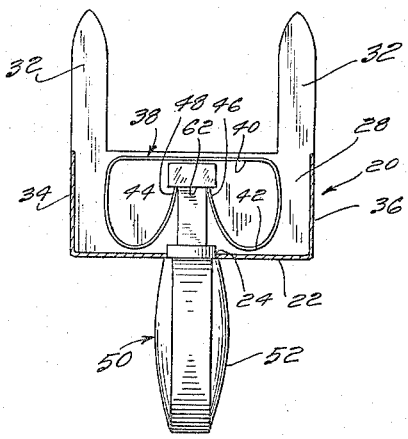
FIG. 2 is a sectional view of the housing of the turn lock assembly embodied herein, wherein the relative positions of the lock member and spring associated therewith are illustrated.
Figure 3:
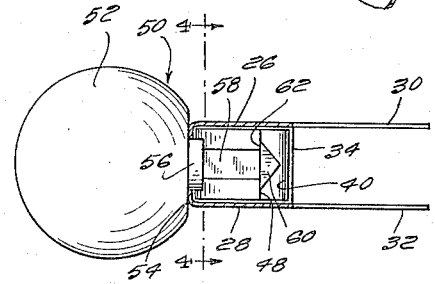
FIG. 3 is a sectional view taken along lines 3—3 in FIG. 4.
Figure 4:
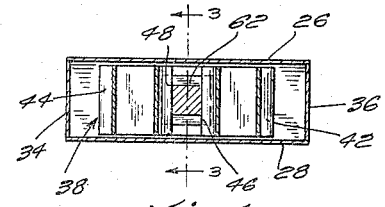
FIG. 4 is a sectional view taken along lines 4—4 in FIG. 3.

In the assembly of the lock member 50 within the housing 20 and to the spring 38, the tapered head portion 60 is inserted through the opening 24 of the top wall 22 of the housing, the square-shaped configuration of the opening 24 permitting the enlarged head portion 60 to be easily inserted therethrough. With the spring 38 located within the housing 20 such that the bottom portion 40 is positioned in the exposed open bottom of the housing and with the U-shaped portions 42 and 44 located as illustrated in FIG. 2, the lock member 50 is pushed inwardly of the housing 20 with sufficient force to cause the enlarged head portion 60 to move between the spaced ends 46 and 48 until these ends snap into engagement with the square shoulder 62. The free ends 46, 48 are thus locked on the shoulder 62 and prevent movement of the lock member 50 axially of the housing 20 in an outward direction. Since the turn knob 52 is somewhat enlarged with respect to the opening 24, the lock member 50 can not be shifted to any degree inwardly of the housing 20 and thus the lock member 50 is limited in axial movement within the housing and is further prevented from withdrawal therefrom by the ends 46, 48 of the spring 28 that engage the square shoulder 62.

The configuration of the turn knob 52 is such that when the turn knob is rotated to that position where it is generally aligned with the top wall 22, the opening 18 in the grommet 16 will receive the turn knob therein. Thus the flap 12 may be located in the fastened position thereof by turning the turn knob 52 to the proper aligned position with respect to the housing 20 and placing the grommet 16 thereover. The turn knob 52 is then rotated 90 degrees to the position illustrated in FIG. 1 to thereby lock the flap 12 on the wall 10.

The rotating movement of the lock member 50 is normally restrained in either a latched or unlatched position by the U-shaped portions 42, 44 of the spring 38, the ends 46, 48 of which engage the square shoulder 62. When it is desired to rotate the lock member 50, the U-shaped portions 42, 44 yieldably permit this rotation, thereby resulting in a snap action movement of the lock member to either the latched or unlatched position. As seen in FIG. 2 the lowermost end of the tapered enlarged portion 60 is spaced from the bottom portion 40 of the spring 38. As further shown in FIG. 2 the outermost ends of the U-shaped portions 42, 44 are also spaced from the inner surface of the top wall 22 of the housing. By providing the slight spacing as indicated, the spring 38 has some degree of movement when the lock member 50 is rotated. This movement is restrained, of course, by the housing walls, but since there is some degree of movement of the spring as the lock member rotates, a slapping sound is produced as the lock member 50 is snapped to either the latched or unlatched position. This slapping sound as produced by the movement of the spring against the walls of the housing creates a positive latching or unlatching effect that audibly indicates to the user that the lock member 50 has been moved to either the latched or unlatched position.

It is seen that the construction and arrangement of the turn lock assembly embodied in the present invention is simple and economical. The assembly of the lock member to the spring 38 as located in the housing is accomplished by merely inserting the shank portion of the lock member through the opening 24 in the top wall of the housing until the free ends 46, 48 of the spring snap on to the square shoulder 62 defined by the stem 58 and the enlarged head portion 60. Once the free ends of the spring have engaged the shoulder 62 of the shank portion, the lock member 50 cannot be withdrawn from the housing and is thereby restrained from axial movement therein. The spring 38 further cooperates with the square-shaped stem 58 to yieldably permit the snap-action movement of the lock member 50 as it is rotated to the latched or unlatched position.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular form herein shown and described except insofar as indicated by the scope of the appended claims.

I claim:

1. In a turn lock assembly for use in the securement of a flap in a closed position on a wall of a handbag, a housing having an open bottom and being defined by spaced side walls, a top wall joined to said side walls, and end walls joined to said top wall and being bent with respect thereto between said spaced side walls, means formed on said side walls for securing said housing to the wall of said handbag, a leaf spring located in said housing and including a bottom portion that defines the bottom of said housing, U-shaped spring portions joined to said bottom portion and occupying a substantial portion of said housing, said U-shaped portions terminating in ends that are spaced from said bottom portion, the top wall of said housing having an opening formed therein, and a lock member including a turn knob and a shank portion joined to said turn knob on the underside thereof, said shank portion including an annular bearing portion that is interconnected to said turn knob, a stem joined to said bearing portion and being non-circular in cross section, and a tapered head portion joined to said stem, and defining a shoulder therewith, said shank portion projecting through the opening in the top wall, the configuration of said opening permitting entry of the tapered head portion therethrough, said annular bearing portion being located in said opening and said head portion being located interiorly of said housing and between the U-shaped portions of said leaf spring, the ends of said U-shaped portions engaging the shoulder on said stem for limiting axial movement of said lock member and preventing removal of said lock member from said housing, the engagement of said spring ends with said stem providing for yieldable rotation of said stem to locate said lock member in either the latched or unlatched position.

2. In a turn lock assembly, a housing having an open bottom and including spaced side walls, a top wall joined to said side walls and having an opening formed therein and end walls joined to said top wall, a leaf spring located in said housing and including a bottom portion that defines the bottom of said housing, U-shaped spring portions joined to said bottom portion and occupying a substantial part of the interior of said housing, said U-shaped portions terminating in ends that are spaced from each other and from said bottom portion, and a lock member including a turn knob located exteriorly of said housing and a shank portion joined to said turn knob and projecting through said opening into said housing, said shank portion including a non-circular stem and a relatively enlarged head portion joined to the lowermost end of said stem, the junction of said stem and head portion defining a shoulder that receives said spring ends in engagement therewith, wherein said lock member is limited in axial movement and is prevented from being removed from said housing, said spring being yieldable upon rotation of said stem to urge said lock member in either a latched or unlatched position.

3. In a turn lock asssembly, a housing having an open bottom and a top wall formed with an opening therein, a spring member located in said housing and including a bottom portion that occupies a substantial part of the open bottom end of said housing and thereby defining a bottom therefor, U-shaped spring portions joined to said bottom portion and terminating in ends that are spaced from each other and from said bottom portion, a lock member rotatably mounted in said housing and including a turn knob located exteriorly of said housing and a shank portion joined to said turn knob and projecting through said opening into said housing, said shank portion including a non-circular stem and a relatively enlarged head portion joined to the lowermost end of said stem, the junction of said stem and said head portion defining a shoulder that receives said spring ends in engagement therewith, wherein said lock member is positively retained in said housing and is limited in axial movement therein.

4. In a turn lock assembly, a housing including a top wall in which an opening is formed, a spring member located in said housing and including U-shaped portions that terminate in adjacent spaced ends, a lock member rotatably mounted in said housing and including a turn knob located exteriorly of said housing, and a shank portion joined to said turn knob and projecting through said opening into said housing, said shank portion including a stem and an enlarged head portion joined to said stem and defining a shoulder therewith, the U-shaped portions of said spring lying generally along planes parallel to the axis of said stem, said adjacent ends of said U-shaped portions engaging said shoulder and cooperating with said turn knob to limit axial movement of said lock member in said housing and to prevent removal therefrom.

5. In a turn lock assembly, a housing including a top wall in which an opening is formed, a lock member rotatably mounted in said opening and including an enlarged turn knob located exteriorly of said housing and a reduced stem joined to said turn knob and projecting through said opening in said housing, said stem being non-circular in cross section, an enlarged head portion joined to said stem and cooperating therewith to define a shoulder, said shoulder having a configuration corresponding to that of said stem, and a spring member located in said housing and including spaced free ends that engage said shoulder, said free ends of said spring member cooperating with said enlarged head portion to limit axial movement of said lock member on said housing and to prevent the removal therefrom, the engagement of said free ends with said non-circular stem yieldably permitting a snap action rotation of said lock member from a latched to an unlatched position.

6. In a turn lock assembly, a housing including a top wall in which an opening is formed, a lock member rotatably mounted in said housing and including an enlarged turn knob located exteriorly of said housing and a reduced shank portion joined to said turn knob and projecting through said opening into said housing, said shank portion including a stem on the end of which a head is formed that cooperates with said stem to define a shoulder, a spring member located in said housing and including free ends that engage said shoulder, said spring member ends thereby cooperating with the exteriorly located turn knob to limit axial movement of said lock member in said housing and to prevent removal therefrom, said head having a tapered configuration that facilitates insertion thereof through the opening in said top wall, said spring member including U-shaped portions to which said free ends are joined, and a bottom portion joined to said U-shaped portions and defining the bottom of said housing, said stem being non-circular in configuration and said shoulder having a corresponding configuration, so that the free ends of said spring that engage said shoulder yieldably permit a snap action rotation of said lock member from a latched to an unlatched position.

References Cited by the Examiner

UNITED STATES PATENTS

| | | | |
|---|---|---|---|
| 1,052,676 | 2/13 | Lotz | 24—221 X |
| 2,203,973 | 2/40 | Walls | 24—221 |
| 2,406,026 | 8/46 | Morehouse | 24—221 |
| 2,454,223 | 11/48 | Shippee | 24—221 |
| 3,025,093 | 3/62 | Millman | 292—204 |

JOSEPH D. SEERS, *Primary Examiner.*